Figure 1:
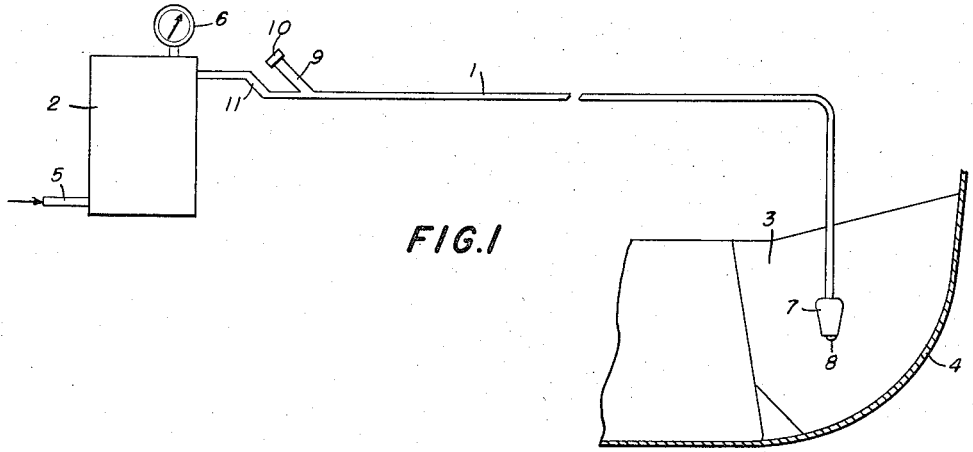

March 17, 1959 J. J. VAN OOSTEN 2,877,735
ALARM SYSTEMS
Filed Oct. 11, 1955

INVENTOR
JOHAN JACOB VAN OOSTEN

BY
ATTORNEYS

United States Patent Office 2,877,735
Patented Mar. 17, 1959

2,877,735

ALARM SYSTEMS

Johan Jacob Van Oosten, Liverpool, Great Crosby, England

Application October 11, 1955, Serial No. 539,901

Claims priority, application Netherlands October 11, 1954

4 Claims. (Cl. 116—118)

The invention relates to an alarm system for the remote signalization in optical or acoustical manner whether a liquid in a room has reached or exceeded a definite level, in which use is made of the weakening or melting of a body.

Such systems are already known. Thus an alarm system is known with a back contact at the control place which is kept close by a bandage of a material, such as filter paper, which weakens when it comes into contact with the liquid to be signalized. Furthermore a system is known with a fall weight, which is kept in a lifted position through the intermediary of a body which melts when it comes into contact with the liquid to be signalized, more particularly sugar, and falls down after melting of the body and actuates the alarm device in an electrical or mechanical manner. Such systems, especially when used for the signalization of a liquid level in room which are not easily accessible, have the drawback that the readiness for working cannot be verified and, by that sometimes the systems remain unused for very long times but are situated in a very unfavourable atmosphere, can get inoperative by impurities or corrosion, so that often they do not work when they have to work and therefore are not reliable. Besides the restoration of the readiness for working of the system after it has worked is difficult and cumbrous.

The invention aims at providing a system with which the above drawbacks can be met.

According to the invention the system is formed by a pipe line connected to a pressure vessel and ending about at the height of the level to be signalized and closed by a closure member which is solid and gas tight in dry condition, but softens or weakens or melts when it comes in contact with the liquid to be signalized, so that gas can escape and the pressure in the pressure vessel falls, which is indicated in optical or acoustical manner. In this way a system is obtained which can be tested at any moment by increasing the pressure in the pressure vessel and with which failure at a moment that working is necessary must be considered practically impossible, whereas also impurities which might be present in the liquid, or corrosion, can have no influence on the operation.

When the system is used for signalizing the reaching or exceeding of a liquid level in an accessible room or when at least the end of the pipe line is accessible, appropriately the pipe line can be closed at the end by a membrane of a material which weakens or dissolves in the liquid to be signalized. For this purpose e. g. paper can be used, which is made air-tight. Also other substances, dissolving or weakening in water but solid in dry condition, can be used.

When the system is to be used for signalizing a liquid level at a place which is not accessible, or not easily accessible, appropriately the pipe line is closed at the end by a, preferably hollow, ball of a material weakening or dissolving in the liquid to be signalized. The nozzle at the end of the pressure line is then appropriately executed in such a manner that the ball is maintained in the nozzle as long as it is dry and solid and at the same time closes the pipe line at the end. Some small leakage forms no objection as the pressure in the pressure vessel can easily be maintained above the critical value. This is not the case if the closure is fully blown out as then too much pressure medium, more particularly air, escapes.

When the system has worked and the end of the pipe line lies at a place which is not accessible or not easily accessible, e. g. under a hold of a ship, after the high liquid level is removed, the system is to be restored in a condition ready for working. For this purpose, appropriately, the pipe line is provided with an inserting branch for a new ball, which can be closed and is inclined downwards in the direction of the outlet end. This inserting branch can be arranged in the neighbourhood of the pressure vessel. After inserting a new ball, preferably after blowing dry and clean of the nozzle of the pipe line, the new ball is brought on its place in the nozzle through the pipe line by admitting pressure medium. The system is then ready for working again.

For preventing that a ball may roll into the pressure vessel, advantageously, the pipe line may be provided with a mounting part between the inserting branch and the pressure vessel, if necessary.

If desired, also two or more pipe lines with closure members can be connected to the same pressure vessel with the intermediary of indicating means for the passage of gas. Then it is possible, when the system makes alarm, to see from the indicating devices which pipe line has caused the alarm and therefore where the liquid level has reached, or meanwhile has exceeded, the predetermined level.

It is remarked that the use of air under pressure for sounding tanks, in which the air pressure forms a measure for the height of the liquid, is generally known, e. g. with the so called pneumercator. Such systems, however, are no alarm systems.

Figure 2:
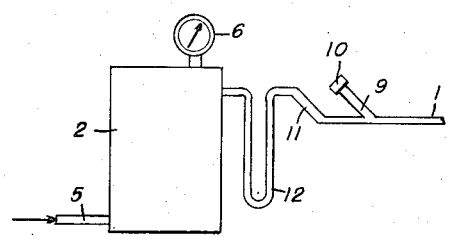
Figure 3:
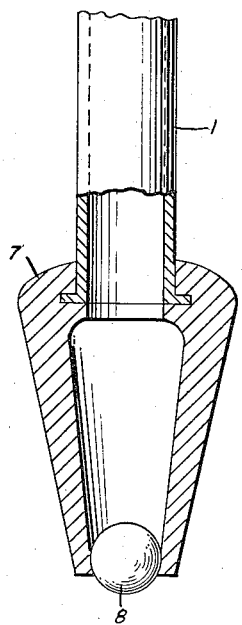
Figure 4:
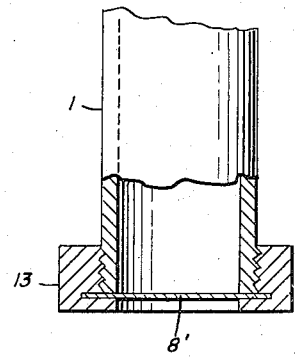

The invention will now be further elucidated with reference to an example of performance shown in the drawing. In the drawing:

Fig. 1 shows, partly in diagrammatic manner, a signalizing system according to the invention, of which the pipe line ends between the bilges of a ship, Fig. 2 shows a similar view in fragmentary form of a modification of the invention, Fig. 3 shows a cross-section on larger scale of the nozzle of the pipe line of Figure 1 with closure ball lying in it, and Fig. 4 shows a cross-section on larger scale of a pipe line which is closed at the end by a membrane.

In the drawing 1 is the pipe line which is connected at one end to a pressure vessel 2, e. g. for compressed air at a pressure of 2 ato, and ends at the other end between the bilges 3 of a ship 4 about at the height of the liquid level to be signalized. The pressure vessel 2 is provided with an inlet nipple 5 and a manometer with alarm switch 6. At the end ending between the bilges, the pipe line 1 is provided with a nozzle 7 which is internally made narrowing in a conical manner to the end and is closed by a, preferably ball 8, preferably hollow and consisting of a material which weakens or dissolves in the liquid to be signalized. When in the case of Figure 1 the liquid level between the bilges mounts to such a height that the ball 8 is moistened by the liquid, more particularly water or sea water, which may be contaminated with some oil, the material of the ball will weaken or soften or dissolve, whereby the ball is driven out under influence of the pressure in the pipe line and a rapid fall of the pressure in the pressure vessel 2 takes place, whereby the manometer 6 actuates the proper alarm device. Thereafter, the liquid, which has caused the alarm, must be removed whereas the inlet nipple 5, of course, is to be closed. After removal of the superfluous liquid, in the case shown the so-called bilge water, appropriately first again some air is admitted through the nipple 5 and the nozzle of the pipe line 1 is blown through and clean and dry. Thereafter a new closure ball can be brought into the pipe line through the inserting branch 9 which is inclined downwards to the free end of the pipe line 1 and is normally closed by a cap 10. By the admittance of air under pressure through the inlet nipple 5, the ball is brought into the nozzle 7, after which the system is ready for working again. The testing of the system can occur e. g by temporarily increasing the air pressure in the vessel 2, so that the closure of the pipe line 1 is blown out forcedly.

For preventing that a new ball will roll into the pressure vessel during inserting, appropriately the pipe line possesses a mounting part 11 between the inserting branch 9 and the pressure vessel 2.

If desired, two or more pipe lines can be connected to a same pressure vessel. In this case it is further recommended to arrange an indicating device in each pipe line 1, which can indicate the passage of the pressure medium, e. g. a U-shaped tube 12 as shown in Fig. 2 with a small amount of a not vaporizing liquid, such as oil, through which the pressure medium bubbles when the closure 8 is blown out.

When the end of the pipe line 1 lies at an accessible place, also a membrane 8' can be used as closure member, as indicated in Fig. 4, which also consists of a material which weakens or dissolves in the liquid to be signalized and can be secured by means of a set ring 13.

As material for the closure member very divergent substances can be used, of which the kind also depends on the liquid to be signalized. If the liquid to be signalized consists of water, or mainly consists of water, the closure member e. g. may consist of paper which is made air tight or of milled cork which is pressed in the right form with a bond soluble in water, or also hard soap or even sugar or like materials can be used. Also for a membrane e. g. agar-agar foil may be used. For oil e. g. a rubber can be used which is sensitive for this liquid, but also paper can serve in this case.

The proper alarm device can also be tested separately, that is to say without blowing through of the closure of the pipe line 1, by decreasing the pressure in the vessel 2 with compressed air, e. g. by allowing the air to escape through an outlet valve when the inlet nipple 5 is closed. Then it can be verified at any time whether the alarm device itself is ready for working.

Having now particularly described and ascertained the nature of my said invention and in what manner the same is to be performed I declare that what I claim is:

1. In combination with the hold of a ship having a liquid therein, alarm means operatively associated therewith to indicate when the liquid reaches a predetermined level to prevent damage to goods contained in the hold, the said alarm means comprising a pressure vessel, signal means operatively connected with the vessel, conduit means communicating with the pressure vessel and terminating in a free open end in proximity to the liquid level in the hold, closure means normally sealing the free open end of the conduit means, the closure means being a ball-like member of a material normally defining a liquid-tight union yet being at least partially disintegrable when the same is contacted by liquid thereby allowing the pressure medium in the pressure vessel and conduit means to escape through the free open end so that a drop in pressure in the pressure vessel actuates the signal means to indicate that the liquid level has reached the predetermined level, and a branch conduit inclined downwardly in the direction of the free open end of the conduit means in communication with the conduit means at a point remote from the free open end whereby a new ball-like member can be inserted into the branch conduit and moved to the free open end of the conduit means to seal such free open end.

2. The combination as claimed in claim 1 in which the conduit means includes intermediate the branch conduit and the pressure vessel, means preventing the ball-like member inserted in the branch conduit from entering the pressure vessel.

3. The combination as claimed in claim 2 in which the means preventing the ball-like member from entering the pressure vessel comprises a section of the conduit means between the branch conduit and the pressure vessel being arranged in substantial parallelism to the branch conduit.

4. The combination as claimed in claim 1 in which said ball-like member is a hollow body.

References Cited in the file of this patent

UNITED STATES PATENTS

| 2,089,369 | Heckert | Aug. 10, 1937 |
| 2,356,283 | Steins | Aug. 22, 1944 |
| 2,402,143 | Arenstein | June 18, 1946 |
| 2,588,204 | Cameron | Mar. 4, 1952 |
| 2,591,037 | Adams | Apr. 1, 1952 |
| 2,640,977 | Parisi | June 2, 1953 |
| 2,679,641 | Liles | May 25, 1954 |
| 2,740,371 | Nelson | Apr. 3, 1956 |

OTHER REFERENCES

Ser. No. 362,231, Rodanet (A. P. C.), published May 4, 1943.